United States Patent
McAdams et al.

(10) Patent No.: US 7,341,456 B2
(45) Date of Patent: Mar. 11, 2008

(54) BRAILLE TYPE DEVICE, SYSTEM, AND METHOD

(76) Inventors: John B. McAdams, 230 Marine Ct., Apt. #7, Lauderdale By-The-Sea, FL (US) 33308; Stephen G. Pinto, 4326 Bougainville Dr., Lauderdale by the Sea, FL (US) 33308

( * ) Notice: Subject to any disclaimer, the term of this patent is extended or adjusted under 35 U.S.C. 154(b) by 0 days.

(21) Appl. No.: 10/808,456

(22) Filed: Mar. 25, 2004

(65) Prior Publication Data
US 2005/0227207 A1 Oct. 13, 2005

(51) Int. Cl.
G09B 5/04 (2006.01)

(52) U.S. Cl. .................. 434/112; 434/116; 235/462.01; 235/462.09; 235/472.01; 235/472.03

(58) Field of Classification Search ................ 434/112, 434/113, 114, 115, 116, 117, 178; 235/462.01, 235/462.02, 472.01, 472.02, 472.03, 462.09
See application file for complete search history.

(56) References Cited

U.S. PATENT DOCUMENTS

| | | | |
|---|---|---|---|
| 4,337,375 A * | 6/1982 | Freeman | 704/260 |
| 4,570,250 A * | 2/1986 | Gabritsos et al. | 369/97 |
| 4,793,812 A * | 12/1988 | Sussman et al. | 434/116 |
| 4,991,091 A * | 2/1991 | Allen | 600/301 |
| 5,033,964 A * | 7/1991 | Phelps | 434/113 |
| 5,779,482 A * | 7/1998 | Fukumoto | 434/113 |
| 5,852,288 A * | 12/1998 | Nakazawa et al. | 235/472.01 |
| 5,945,656 A * | 8/1999 | Lemelson et al. | 235/462.01 |
| 5,971,279 A * | 10/1999 | Raistrick et al. | 235/472.01 |
| 6,095,418 A * | 8/2000 | Swartz et al. | 235/462.01 |
| 6,170,750 B1 * | 1/2001 | Ueno | 235/462.1 |
| 2001/0017817 A1 * | 8/2001 | De La Huerga | 368/10 |
| 2004/0091842 A1 * | 5/2004 | Carro | 434/112 |

FOREIGN PATENT DOCUMENTS

| | | | |
|---|---|---|---|
| GB | 2184588 A | * | 6/1987 |
| GB | 2273387 A | * | 6/1994 |

* cited by examiner

*Primary Examiner*—Dmitry Suhol
(74) *Attorney, Agent, or Firm*—William L. Klima; Klima Law Offices, PLLC

(57) ABSTRACT

A Braille type device including printed or displayed matter on a medium in combination with printed or displayed Braille type code, preferably machine readable Braille type bar code. The Braille type system includes the combination of the Braille type device and a Braille type-scanning device. The Braille type method includes printing or displaying a Braille type bar code on a medium.

16 Claims, 3 Drawing Sheets

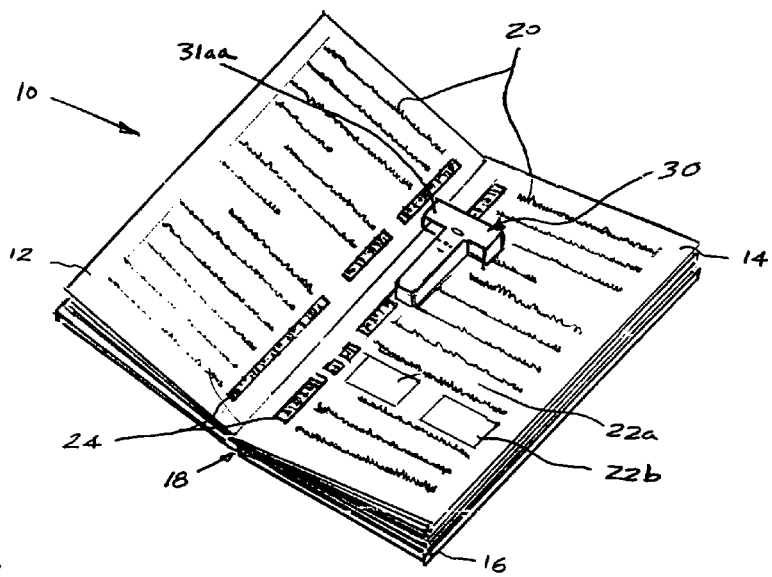
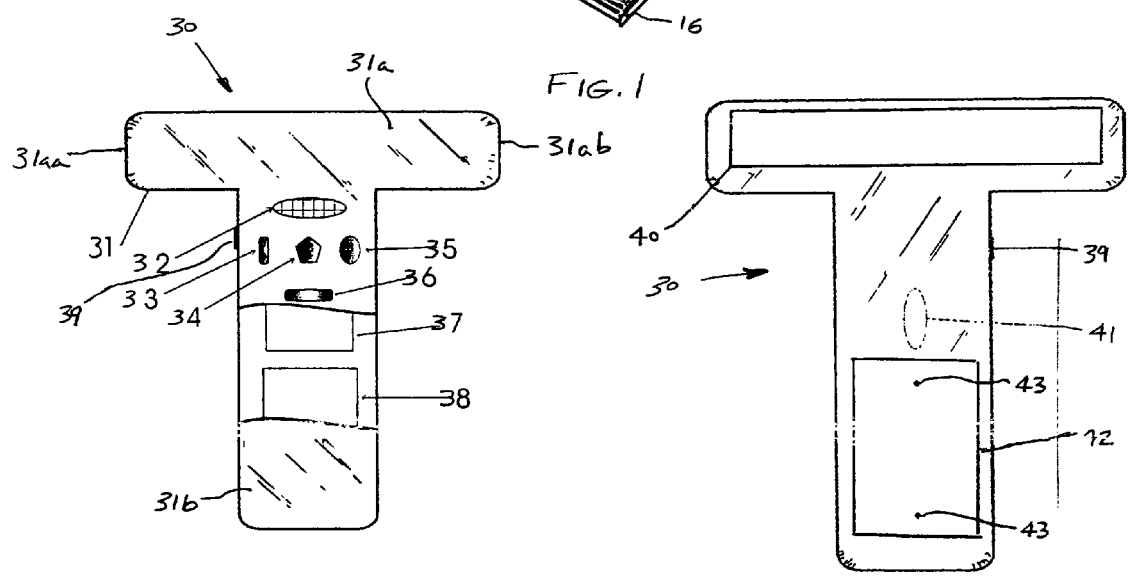
FIG. 1
FIG. 2
FIG. 3
FIG. 4

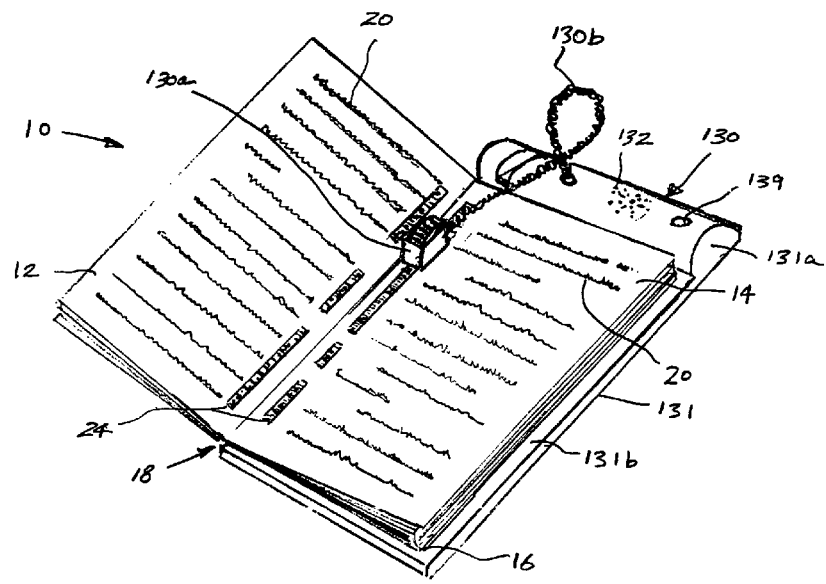
FIG. 5
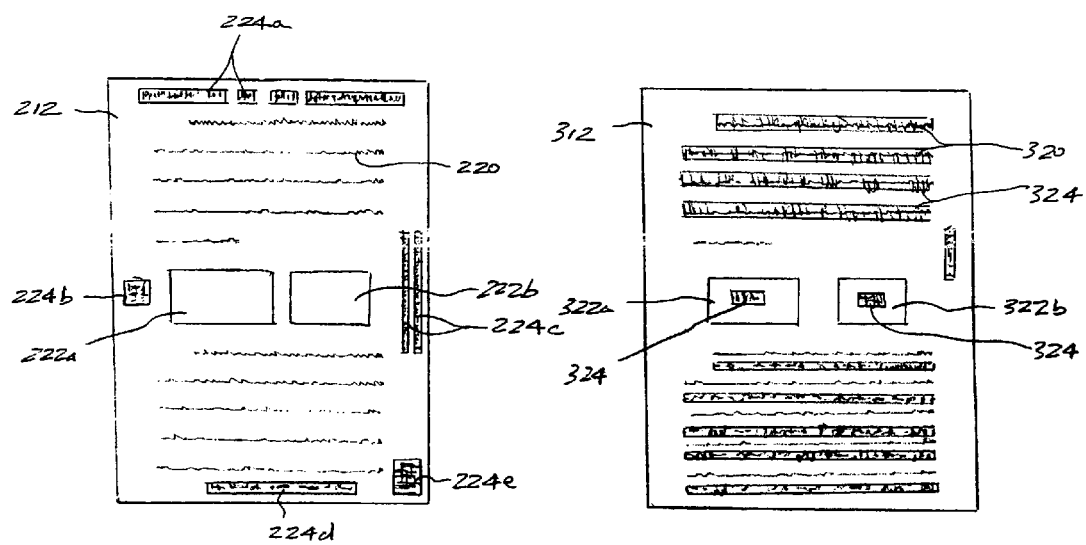
FIG. 6
FIG. 7

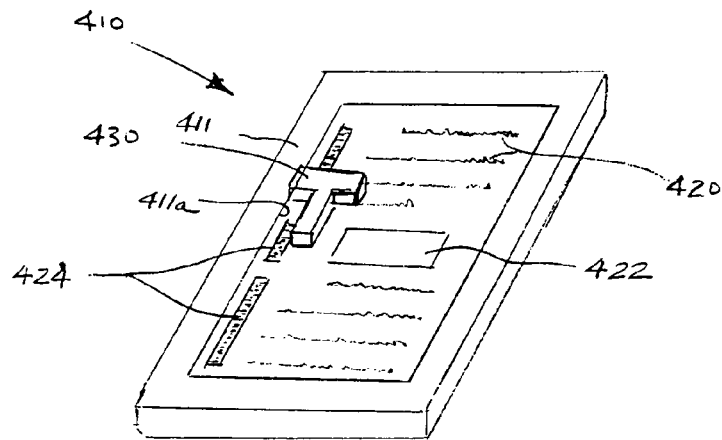
FIG. 8
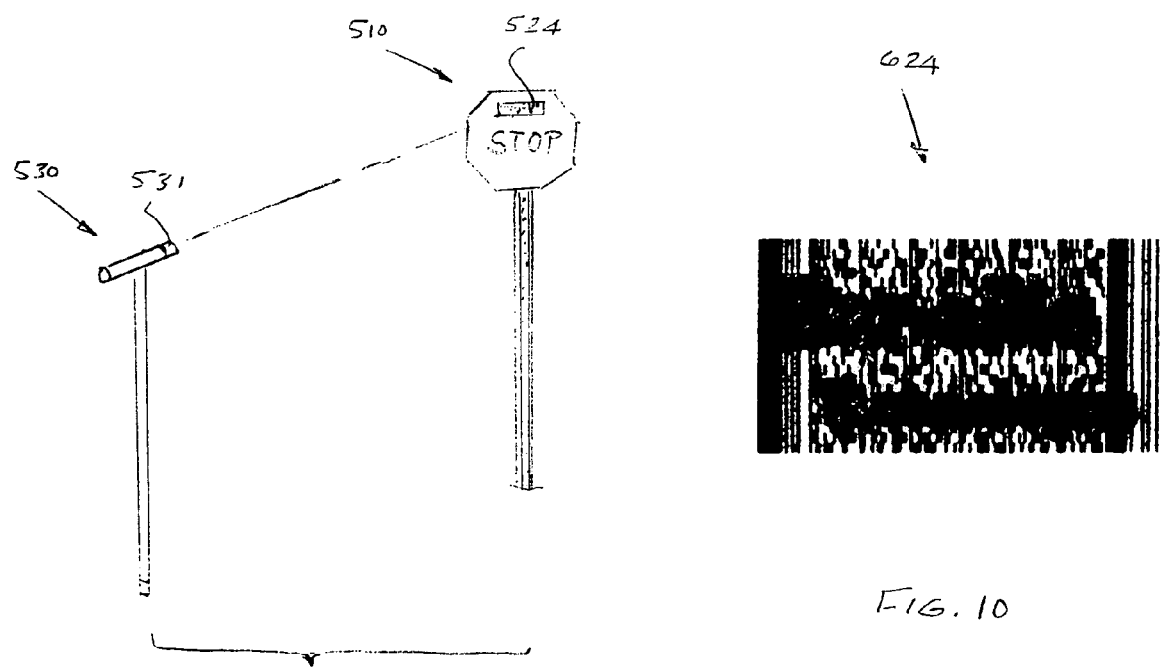
FIG. 9
FIG. 10

BRAILLE TYPE DEVICE, SYSTEM, AND METHOD

FIELD OF THE INVENTION

The present invention is directed to a Braille type device, system, and method. The Braille type device includes printed matter in combination with Braille type code according to the present invention, in particular machine-readable Braille type bar code according to the present invention. The printed matter, for example, can be books, publications, reading materials, literature, brochures, memos, notes, journals, newspapers, and all type of other printed matter supported by a medium, for example, paper, cardboard, plastic, metal, glass, ceramic. The Braille type system includes the Braille type device according to the present invention in combination with a Braille type scanning device, in particular a portable handheld Braille type scanning device, preferably configured to read the Braille type code according to the present invention and provide an audio output, preferably a computer voice or speech. The Braille type method involves a printing method for printing Braille type code according to the present invention on a medium suitable for supporting printed matter.

BACKGROUND OF THE INVENTION

Only a couple of centuries ago, a person born blind or becoming blind during their lifetime suffered a major disability with little hope for becoming a productive person. There existed no means or technology to allow a blind person to read on their own, and thus such persons relied mainly on hearing, speech and touch for interacting with the surrounding world. During the post Napoleonic Wars, a system was created by Louis Braille to allow a person to read a secret code by their finger tips for the purpose of receiving information for spacial coordinates for aiming and shooting artillery at night to avoid the use of light for visual reading of such information. Prior visual reading with light proved to be a significant problem, since the enemy could easily aim and fire at the lit target. Eventually, this code became used by the blind and was named after the inventor Braille.

Since the time when Louis Braille introduced his modified military tactile code as a communication means for the blind in 1829, very little has been done to provide an alternative "language" for the low vision or blind (LV/B) persons. In the times of Helen Keller, there were approximately 250,000 Braille-literate people in the United States. Today, there are only approximately 225,000 Braille-literate people in the United States. Of children (K thru 12) in the United States, only approximately 5,500 can read Braille. There is, however, no new language for the LV/B individuals to free them from either Braille, or other expensive sophisticated devices that may or may not make their lives easier. Most of these devices, which use Braille as their language are both cumbersome and expensive.

Braille is a pattern of raised dots or bumps in a particular pattern to symbolize an alphanumeric letter, thus a different pattern exists for each letter of the alphabet. A person reading the code places his or her finger tip of the index finger of their reading hand over the Braille, and begins to read left to right, top to bottom. Braille is a relatively difficult system to learn and use, since it is extremely difficult for a person to acquire the sensitivity or ability to accurately feel the raised dots or bumps to an extent to be able to interpret and understand each particular letter.

Today, being blind is still a significant disability substantially inhibiting employment, daily activities, and hampering personal and professional productivity. This significant disability renders most of such blind persons unable to function successfully in today's advance computer based work environments, and thus most are unemployable, even in service industries, even though most blind person desire to work and live like the rest of the population.

There exists a substantial need to devise a new device, system and method to allow most blind persons to read printed matter at a level to allow such blind persons to work and compete successfully in a job environment. Recently, Congress has enacted the Instructional Materials Accessibility Act requiring all publishers of printed matters in the United States to devise such a device, system, or method to allow blind persons to obtain the same information contained in published printed matter. The present invention provides such means to allow dissemination of printed matter or published information to the blind.

SUMMARY OF THE INVENTION

An object of the present invention is to provide an improved Braille type device including the printed matter combined with Braille type code.

A second object of the present invention is to provide a Braille type device including printed matter combined with a Braille type code according to the present invention.

A third object of the present invention is to provide a Braille type device including printed matter combined with a machine-readable Braille type code.

A fourth object of the present invention is to provide a Braille type device including printed matter combined with a machine-readable Braille type code, the device being configured to read the machine-readable Braille type code and output an audio signal.

A fifth object of the present invention is to provide a Braille type device including printed matter combined with a machine readable Braille type code, the device being configured to read the machine readable Braille type code and output a machine voice or speech.

A sixth object of the present invention is to provide a Braille type device including printed matter combined with a machine readable Braille type code configured to provide an audio machine speech or voice when scanning the machine-readable Braille type code.

A seventh object of the present invention is to provide an improved Braille type system including a Braille type device according to the present invention combined with a Braille type-scanning device according to the present invention.

A eighth object of the present invention is to provide a Braille type system including a Braille type device having printed matter combined with an improved Braille type code according to the present invention, in combination with a Braille type scanning device according to the present invention.

A ninth object of the present invention is to provide a Braille type system including a Braille type device having printed matter combined with a machine-readable Braille type code, in combination with a Braille type-scanning device according to the present invention.

A tenth object of the present invention is to provide a Braille type system including a Braille type device having printed matter combined with a machine readable Braille type code, in combination with a Braille type scanning device configured to provide an audio machine voice or speech.

An eleventh object of the present invention is to provide an improved Braille type method.

A twelfth object of the present invention is to provide a Braille type method of combining printed matter with an improved Braille code.

A thirteenth object of the present invention is to provide a Braille type method of combining printed matter with a machine-readable Braille type code.

A fourteenth object of the present invention is to provide a Braille type method of combining printed matter with a machine readable Braille type code, machine reading the Braille type code, and machine speaking the Braille type code read.

The present invention is directed to a Braille type device, system and method. The Braille type device includes printed matter in combination with a Braille type code, in particular a Braille type code according to the present invention. The term "Braille type" means Braille, the same as Braille, similar to Braille, related to Braille, same or similar operation as Braille, same or similar function as Braille, or otherwise a device system, method, process or means for converting information from one form to another form that can be used or sensed (e.g. voice, speech, or heard and/or felt) by the blind or low vision. The term "Braille type" is not limited to actual Braille.

The term printed matter can refer to any of a wide variety of printed matter including, books, hard cover bound books, paper back books, publications, newspapers, magazines, journals, periodicals, reading materials, literature, brochures, memos, notes, certificates, commercial paper, money, paper money, negotiable instruments, stock certificates, legal documents, legal papers, motions, discovery, interrogatories, decrees, judgments, wills, trusts, stamps, business cards, folders, files, packaging, boxes, letters, envelopes, labels, notebooks, papers checks, negotiable instruments, checks, money orders, credit cards, and any and all other types of conventional or new types of printed matter. Further, the term printed matter can specifically refer to marks, fonts, text, images, pictures, illustrations, texture, dots, bumps, bar codes, matrix, and even Braille itself.

The printed matter is supported on a medium including paper, newspaper, cardboard, film, plastic, wood, metal, glass, ceramic, composite material, cloth, fabric, and any and all other types of conventional or new types of mediums. Alternatively, or in addition, the print matter can be displayed matter, for example, text, pictures or diagrams visually displayed or invisibly displayed on a television screen, monitor, electronic display, cathode ray tube (CRT), plasma screen, liquid crystal display, or otherwise displayed, but not printed. This displayed matter can be permanent, or can be changed or varied with time.

The Braille type code according to the present invention is configured to be supported by the same medium supporting the printed or displayed matter. Preferably, the Braille type code according to the present invention is a machine-readable Braille type code. For example, the Braille type code according to the present invention is preferably printed or displayed matter, and configured to be read with a scanner, in particular a hand held scanner. More specifically, the Braille code according to the present invention can be printed or displayed on a medium, and then read by a scanner.

The Braille type code according to the present invention can be in the format of a one (1) dimensional bar code, two (2) dimensional bar code, three (3) dimensional bar code, matrix code or other type of printed matter that can be read and understood in the context of alpha numeric characters, words, sentences, paragraphs, chapters, for example, of a book, publication or other printed matter. A Braille type code according to the present invention using a one (1) dimensional bar code can be machine read and converted into an audio machine voice or speech designating a particular letter. A Braille type code according to the present invention using a two (2) dimensional or higher dimensional bar codes or matrix codes, can provide enough information content to allow such Braille type codes to be read and converted into an audio machine voice or speech pronouncing entire words and sentences.

The Braille type code according to the present invention can be provided in a variety of configurations or formats. For example, a printed Braille type code according to the present invention can be provided on separate pages at the beginning or end of a book. Alternatively, the printed Braille type code according to the present invention can be printed in the top, side and/or bottom margins of a printed page. Preferably, the printed matter on a particular page matches or registers with the printed Braille type code on the same page. In a more preferred embodiment, the printed Braille type code is on the side margin along the binding of the particular book, and can be read from top to bottom by a hand held Braille type scanner according to the present invention. Alternatively, the printed Braille type code according to the present invention can be interlineated between the lines of the printed matter on a particular page, or can be overprinted over the printed matter using an invisible ink (e.g. infrared type ink). In this embodiment, the Braille type scanner according to the present invention would use an infrared detector to read the overprinted Braille type code.

The Braille type system according to the present invention includes the Braille type device according to the present invention combined with the Braille type-scanning device according to the present invention. For example, the Braille type system can include a printed document according to the present invention having both printed matter and printed Braille type code, copying or repeating the printed matter, in combination with a hand held Braille type scanner according to the present invention. The hand held Braille type scanner is configured to read the printed Braille type code, and convert same into a machine voice or speech. In a preferred embodiment, the printed Braille type code is also encrypted to provide added operational features or security aspects.

The hand held Braille scanner according to the present invention is loaded with software configured to allow the hand held scanner to read the printed Braille type code, and then interpret or convert the read Braille type code into a machine voice or speech outputted from a audio speaker or speaker system of the hand held Braille type scanner. The portable aspect of a hand held type or lab top type Braille type scanner greatly facilitates mobility of the system for the blind person needing to move the system from one location to another, particularly in a job environment.

BRIEF DESCRIPTION OF THE DRAWINGS

FIG. 1 is a perspective view of a Braille type device according to the present invention, namely a book provided with printed matter in combination with Braille type code according to the present invention, and Braille type system according to the present invention including a Braille type device according to the present invention in combination with a Braille type scanning device according to the present invention.

FIG. 2 is a top planar view of a Braille type-scanning device according to the present invention.

FIG. 3 is a bottom planar view of the Braille type-scanning device, as shown in FIG. 2.

FIG. 4 is an elevational end view of the Braille type scanning device, as shown in FIGS. 2 and 3.

FIG. 5 is a perspective view of another embodiment of the Braille type device and Braille system according to the present invention.

FIG. 6 is a top planar view of a page showing printed matter in combination with printed Braille type bar code according to the present invention.

FIG. 7 is a top planar view of another page showing printed matter in combination with printed Braille type bar code according to the present invention.

FIG. 8 is a perspective view of another embodiment of the Braille type device according to the present invention configured to display matter and Braille type bar code according to the present invention.

FIG. 9 is a perspective view showing a cane for the handicapped provided with a Braille type-scanning device according to the present invention configured to scan a sign provided with Braille type bar code according to the present invention.

FIG. 10 is a sample of a Braille type bar code according to the present invention.

DETAILED DESCRIPTION OF PREFERRED EMBODIMENTS

The Braille type device according to the present invention includes printed matter combined with Braille type code according to the present invention. The printed matter is supported on a medium, and the Braille type code according to the present invention is provided on the same medium as the printed matter, or on another medium associated with the medium supporting the printed matter.

The printed matter can be any of a wide variety of printed matter including books, hard cover bound books, paper back books, publications, newspapers, magazines, journals, periodicals, reading materials, literature, brochures, memos, notes, certificates, commercial paper, money, paper money, negotiable instruments, stock certificates, legal documents, legal papers, motions, discovery, interrogatories, decrees, judgments, wills, trusts, stamps, business cards, folders, files, packaging, boxes, letters, envelopes, labels, notebooks, papers checks, negotiable instruments, checks, money orders, credit cards, and any and all other types of conventional or new types of printed matter The printed matter is supported on a medium including paper, bond, newspaper, cardboard, plastic, plastic sheet, film, plastic film, metal, metal sheet, glass, ceramic, composite material, cloth, fabric, and any and all other types of conventional or new types of mediums.

The Braille type code according to the present invention can be a one (1) dimensional bar code, two (3) dimensional bar code, three (3) dimensional bar code, matrix code or other suitable format. Preferably, the Braille code according to the present invention is configured to be machine read, for example, by a Braille type scanning device according to the present invention, in particular a hand held scanner. The hand held scanner can be a stand-alone type or connected by a wire to a scanner support.

A Braille type book device 10 according to the present invention is shown in FIG. 1. The book device 10 is provided with one or more pages 12 and 14 bound at the inner edges 12a and 14a, respectively, to book cover 16 to define a book spine or binding 18. The pages 12, 14 of the book device 10 are printed with text 20, pictures or diagrams 22a and 22b, and Braille type code 24 according to the present invention.

A hand held portable Braille type-scanning device 30 according to the present invention is shown in FIG. 1 positioned readied to read the bar code 24 from top to bottom on each page. As shown in FIG. 1, the Braille type-scanning device 30 is configured to glide or slide along and scan the upper surface of pages 12, 14. As shown in FIG. 2, the Braille type-scanning device 30 is provided with a body 31, including a wider upper body scanning portion 31a and a thinner lower body griping portion 31b. The upper body scanning portion 31a is provided with a left guiding edge 31aa and right guiding edge 31ab. The guiding edges 31aa and 31ab ride along the spine or binding 18 of the book device 10, as shown in FIG. 1, allowing page 12 to cooperate and act as a stop with the left guiding edge 31aa of the Braille scanning device 30 as the Braille scanning device 30 is moved from the top of the page 14 to the bottom of the page 14. Page 12 itself acts as a guide due to the angle between pages 12 and 14 (i.e. pages 12 and 14 are substantially perpendicular to each other when the book device 10 is opened). The guiding edge 31ab of the Braille type-scanning device 30 is used when reading page 12 of book device 10.

The Braille type-scanning device 30 is provided with an audio speaker 32, volume wheel 33, pause/plan button 34, skip button 35 and rocker button 36. It is important to understand that the scanning device 30, as shown in FIGS. 2 thru 4 are an example of an embodiment of the scanning device according to the present invention, however, other shapes, configurations of the device itself and/or the layout and type of buttons, switches and speakers can be varied or changed within the context of the scanning device according to the present invention. Further, the scanning device 30 is provided with an on-board computer/processor 37 and a rechargeable battery 38. To turn the Braille scanning device 10 on or off, an on/off slide 39 is provided on the side of the lower body griping portion 31b.

As shown in FIG. 3, the bottom side of the Braille scanning device 30 is provided with an omni-directional photo emitter/receptor 40, a scanner light trigger 41, a battery/processor access panel 42, and a pair of securing screws 43 for removeably retaining the access panel 42 onto the bottom of the body 31 of the Braille type scanning device 30.

As shown in FIG. 4, the lower end of the lower body griping portion 31b is provided with a head phone jack 44, a power supply/battery recharging jack 45 and a mini U.S.B. cord 46.

The scanning device 30 can have several different configurations, from hand-held scanners, to desktop scanners configured to read full pages (e.g. like a a computer scanner). The scanning device 30 includes a scanner head, interpretive electronic processing and memory hardware, and audio and/or visual display. The configuration of the housing itself is less of importance than component synergism and common function. A considered exception provides for a scanning head configuration on the portable, hand-held scanner to accommodate the apex of page interfaces in a book, magazine, etc., whereby the apex functions as a physical registration presence to position the scanner in such a way as to be directly confronted with the new bar code images at the face of the scanner. Thus, when the scanner head is placed in the apex of the book, with the scanner face "looking" at the right margin of the left page where the new bar code image is presented, the scanner is registered and ready to be manually scanned down the page, all the time reading the new bar code text that occurs, with the corresponding printed words of that page. Similarly, when the next (right) page is to be scanned, the scanner is positioned with the scanner head facing the left hand margin of the right page where it can again be manually swept down scanning that column of the new Braille type bar code corresponding to the printed words of that page. The scanner 30 is capable of scanning, reading and interpreting the new Braille type bar code.

The Braille type code according to the present invention is preferably a Braille type bar code. The Braille type bar codes according to the present invention can have a variety of fonts, formats and densities, each tailored specifically for the application for which it is to be designed. In a preferred embodiment of the Braille type bar code according to the present invention, a bar code is utilized which has information storage capacity or information content capable of encoding languages. In a particular preferred embodiment of the present invention, the language selected is English. However, other embodiments provide for one or more foreign language(s).

The Braille type bar code according to the present invention can be printed in various configurations, and at one or more locations on a page, document, or book. For example, a book can be printed with Braille type bar code according to the present invention on the front cover, back of the front cover, back cover (either or both sides), one or more separate pages not having any printed matter (e.g. text, pictures, or diagrams), on pages having printed matter, or any other suitable and accessible location on the book.

Preferably, the Braille type bar code is configured or arranged so as to register with a particular page, paragraph, sentence, work, picture, diagram, or other discrete element of printed matter printed on the pages of the book or document. As shown in FIG. 6, printed Braille type bar code 224*a* for the entire text or portion thereof can be provided in the upper margin of the page 212. Alternatively, or in addition printed Braille type bar code 224*b* can be provided in the left margin (e.g. to describe in detail adjacent pictures or diagrams), printed Braille type bar code 224*c* can be provided in the right margin (e.g. two columns, one column for text and one column for sound (e.g. music), or one column for one language and one column for another language), printed type bard code 224*d* can be provided in the bottom margin (e.g. story book version with text voice or speech combined with sound (e.g. music and background sounds and noises), and printed Braille type bar code 224*e* can be provide in the lower right corner of the page 212 (e.g. to provide text, description of pictures or diagrams, music, sounds, noises for the entire page at one location). In these embodiment, the Braille type bar codes are printed at locations on the page 212 not occupied by printed matter (e.g. text 220, pictures or diagrams 222*a*, 222*b*).

As shown in FIG. 7, the page 312 is provided with printed matter (e.g. text 320, pictures or diagrams 322*a*, 322*b*) and Braille type bar code 324 overprinted over the printed matter. The Braille type bar code 324 can register exactly on a letter, word, paragraph, picture, or diagram basis, or can be located somewhat off registration with same.

Another embodiment of the Braille type device 410 according to the present invention is shown in FIG. 8.

The Braille type device 410, for example, is a television screen or computer monitor or screen. The Braille type device 410 is configured to display matter 420 and display Braille type bar code 424 according to the present invention. A Braille type-scanning device 430 is configured to scan the Braille type bar code 424 and convert same into an audio machine voice or speech, the same or similar to the Braille type device 30 as shown in FIGS. 1-4. In this particular embodiment, the matter displayed 420 can be permanent or more preferably can be changed with time as selected by the user. The Braille type device 430 is configured to glide along an edge 411*a* of the frame 411 of the Braille type device 410.

A further embodiment of the Braille type device 510 is shown in FIG. 9.

The Braille type device 510 is shown as a "stop" sign having a visible or invisible Braille type bar code 524 printed thereon. A Braille type scanning device 530 is configured as a handicapped cane having a scanning head portion 531. The Braille type-scanning device 530 is configured to scan Braille type bar code located on streets, sidewalks, buildings, doorways, and hallways inside or outside. The Braille type device 530 can scan up to distances as great as one hundred feet or more. For example, the Braille type bar code according to the present invention can be visibly or invisibly printed or displayed on a wide variety of items encountered during a typical day, including, street signs, signage, building addresses, directories, door signs, bathrooms, warning signals, and a wide variety of other conventional types of printed matters or displays.

A sample of a Braille type bar code 624 according to the present invention is shown in FIG. 10.

This particular Braille type bar code 624 is a two (2) dimensional bar code having lines or bars in one dimension, and discontinuous bars or lines in a second dimension located perpendicular to the first dimension. In this manner, information can be stored into two (2) dimensions, providing a higher information content verses a single dimension bar code.

A Braille type bar code according to the present invention selected to represent a number of characters can be a one (1) dimensional or linear bar code (1-d), a two (2) dimensional (2-d) bar code (e.g. PDF 417), or any of a variety of some 1-d, and most 2-d, 3-d, or matrix codes. In a preferred embodiment of the present invention, a variation of PDF 417 is selected to create the Bar-aille™ code. Other versions of other 1-d, 2-d, 3-d, or matrix codes can be developed to provide the same or same type of functions and performance. For example, a one (1) inch by one (1) inch, 2-d bar code is capable of containing all the text of the U.S. Constitution, and is capable of being read by a scanner programmed appropriately, and then this information is converted into transition data or speech. The transition from text to Bar-aille™ code is accomplished through a computer program or software, which can also convert digital data supplied from direct input via keyboard or other means of stored digital data (computers, programs, disks, CDs, etc., directly into Bar-aille code). The purpose of converting text into Bar-aille™ code, then into speech, or vice-versa, is to enable accessibility of all typed, printed, displayed, or spoken materials via a micro-symbology electronically accessed means which would not be sight sensitive or requiring literacy.

The printed Braille type bar code according to the present invention provides for a new micro-symbolic language, and means of use by the low vision and blind. The present invention, preferably utilizes an expanded variation of bar code or 2-d bar code, or even a more versatile, Matrix code, or even the greatest capacity, 3-d or "bumpy" code, which has far greater capacity to encode all the nuances of sophisticated modem languages as is commonly written or spoken. As described, this technology can benefit not only the low-vision and blind, but also can be used to teach the illiterate and others being language illiterate.

The present invention provides the creation of a new language written in a special bar code format that addresses all the needs and functions of any contemporary language. To satisfy this need, a new bar code will eventually be assigned to all spoken sound variations of words, through various pluralities, conjugations, tenses, etc. of the English language. Those familiar with the art would recognize immediately the ability to assign this to another language or languages. However, in the preferred embodiments English is the chosen language. In all cases the written English word will appear in discreet bar code format unique to that word. This would allow printed matter such as a book, publication, document, magazine, catalog, instruction manual, directions, application, government form, etc., to be encoded in the new bar code "language" which would allow for exact word-to-word, sentence-to-sentence, paragraph-to-paragraph, page-to-page, translation into a bar code document that could be "read" with an appropriate Braille type bar code scanner. If one desired the Braille type bar code to appear on the same pages of a book as the written conventional print matter, then the Braille type bar code could be printed in an area nearby to the area containing the conventional printed matter, or the Braille type bar code can be printed directly over the conventional printed matter. In order to reduce misreading of either the visible printed English text or the visible Braille type bar code, the Braille type bar code or new language can be printed invisibly. The Braille type bar code need not be visible as it is designed to facilitate reading for non-sighted persons, and thus the user would be unable to see the Braille type bar code anyway. Thus, a book could be written in conventional print for sighted persons while also printed invisible (e.g. ultraviolet or infrared responsive inks which are not visible to the sighted human eye). Since the new language or Braille type bar code is invisible, the Braille type invisible bar code may be overprinted directly over the English print matter for the sighted.

It should not be construed that the present invention is restricted to visible or invisible Braille type bar coding or restricted to only the English language. Since English has more words than many other languages, it would be much easier to translate the new Braille type bar code or language according to the present invention into French, German, Spanish, and essentially all the other languages, and thus English has been chosen as a preferred embodiment, but is not restricted to that language.

Further, a book is not the only delivery means of providing the new Braille type bar code or language according to the present invention to the user. Braille type bar code can appear as a scroll, which can be scanned by a fixed scanner that has the Braille type bar code streaming by in a scroll that could be supplied by a rolled reserve spool of text and gathered up by a gathering spool much the same as a fax or typewriter ribbon. Further, the present invention provided a new Braille type bar code for use in a computer in the format of CDs, DVDs, floppy disks, etc. A fixed scanner means can similarly be installed into the computer that can read the new Braille type bar cod or language. Since the users typically are LV/B, translation into written language is of little value, since that is sight demanding technology, this invention deals largely with the text-to-speech technology from this new Braille type bar code language to English (i.e. the Braille type bar code is translated into English words, which are then spoken from the translating scanner corresponding to the words scanned and translated from the new Braille type bar code).

For example, the new Braille type bar code can be a variation of an existing bar code such as a matrix code or PDF 417, or another so called 2-d bar code chosen because of its large capacity for characters and thus capacity for a number of words. This code can be modified to provide for this new capability, or a whole new Braille type bar code font and code can be created to provide for this capability of intellectual property protection. Another variation of the scanned new Braille type bar code text and scanner, can be used to "back up", or index a verbalized word, and provide a definition of that particular word.

In a preferred embodiment of the present invention, a printer of the new Braille type bar code must be so programmed, process capable, and configured so as to be able to print the new Braille type bar code on pages as demonstrated above or in a variety of other positioning schemes relative to the various folds, shapes, layout etc., of the various legions of publications that exist. In this preferred embodiment, the new Braille type bar code is printed in ink, which is not visible to the normal sighted eye and consequently the print needs to be equipped with an illumination means of a light wavelength that stimulates and makes visible the otherwise invisible printed new bar code for the purposes of inspection, verification of printing, and for other quality control purposes. These printers must be capable of interpretation of data to cause the written or electronic text to be properly encoded into the new Braille type bar code and printed in that manner.

We claim:

1. A Braille type system, comprising:
a book including at least one page bound at an inner edge to a book cover to define a book spine;
printed matter including printed text for a sighted person printed on said at least one page;
Braille type bar code printed adjacent and along said book spine on said at least one page, said Braille type bar code being a linear high density multi-dimensional Braille type bar code, said linear high density multi-dimensional Braille type bar code being oriented parallel relative to said inner edge of said at least one page and located within a margin of said at least one page so that said book spine functions as a linear guide for a person using a contact type hand held scanning/reading device for scanning and reading said Braille type bar code, said Braille type bar code emulating said printed text and configured to be scanned by the contact type hand held scanning/reading device when the user places the contact type hand held scanning/reading device in contact with said at least one page and then slides the contact type hand held scanning/reading device along the upper surface of said at least one page and along said book spine; and
a hand-held contact type scanning/reading device for scanning and reading said Braille type bar code when placed in contact with said at least one page and then moved and guided along by said upper surface of said at least one page and by said book spine over the Braille type bar code by a user's hand, said contact type scanning/reading device including a body having at least one guiding edge for positioning an omni-directional photo emitter/receptor of said contact type scanning/reading device a fixed distance from said inner edge of said at least one page and said book spine for accurately positioning and guiding said omni-directional photo emitter/receptor over said Braille type bar code during scanning/reading by said contact type scanning/reading device.

2. A system according to claim 1, wherein said body of said scanning/reading device is provided with a left guiding edge for guiding said scanning/reading device while scanning and reading said Braille type bar code.

3. A system according to claim 1, wherein said printed Braille type bar code is configured so that said Braille type bar code is read top to bottom.

4. A system according to claim 1, wherein said at least one page of said book is printed on both sides with said printer matter and corresponding said Braille type bar code, and said hand-held scanner is provided with a left guiding edge and a right guiding edge for guiding said scanning/reading device while scanning and reading said Braille type bar code on said front side and back side, respectively, of said at least one page.

5. A system according to claim 1, wherein said hand-held scanner includes a wider upper body scanning portion provided with said at least one guiding edge, and a thinner lower body gripping portion.

6. A system according to claim 1, wherein said book contains a plurality of said at least one page.

7. A system according to claim 6, wherein said Braille type bar code is located adjacent and along said inner binding edge of said at least one page, said inner binding edge functioning as a vertical guide and horizontal index for the hand held contact type scanning/reading device.

8. A system according to claim 1, wherein said Braille type bar code is provided in a single line and emulates said printed text on said at least one page in machine readable language.

9. A system according to claim 1, wherein said at least one page includes at least one picture, and said Braille type bar code describes said at least one picture in machine readable language.

10. A system according to claim 1, wherein a single line of said Braille type bar code located on said at least one page emulates said printed text located on said at least one page.

11. A system according to claim 1, wherein said Braille type bar code is a matrix type bar code.

12. A system according to claim 1, wherein said at least one page is printed with said Braille type code at multiple locations on said at least one page.

13. A system according to claim 1, wherein said Braille type bar code is printed in both side margins of said at least one page.

14. A system according to claim 1, wherein said Braille type bar code is printed in a top margin, bottom margin, and side margin of said at least one page.

15. A system according to claim 1, wherein said Braille type bar code is a two (2) dimensional type bar code.

16. A system according to claim 1, wherein said Braille type bar code includes multiple types of Braille type bar codes.

* * * * *